United States Patent [19]
Dziomba et al.

[11] 3,815,620
[45] June 11, 1974

[54] MEASURING AND/OR CONTROL DEVICE FOR THE SETTING OF THE CONSTITUENTS OF A CHEMICAL SOLUTION ESPECIALLY OF A GALVANIC BATH

[75] Inventors: Willy Dziomba; Rainer Beule, both of Wolfsburg; Günter Dreyer, Kl. Sissbeck; Gerhard Wolf, Wolfsburg, all of Germany

[73] Assignee: Volkswagenwerk Aktiengesellschaft, Wolfsburg, Germany

[22] Filed: June 18, 1971

[21] Appl. No.: 154,347

[30] Foreign Application Priority Data
June 30, 1970 Germany............................ 2032123

[52] U.S. Cl.................................... 137/90, 137/93
[51] Int. Cl. ............................................ G05d 11/08
[58] Field of Search............. 137/88, 87, 2, 3, 4, 5, 137/90, 91, 92, 93; 204/88

[56] References Cited
UNITED STATES PATENTS
| | | | |
|---|---|---|---|
| 3,195,551 | 7/1965 | Russell | 137/93 |
| 3,299,787 | 1/1967 | Kolb et al. | 137/93 X |
| 3,361,150 | 1/1968 | Horner | 137/93 |
| 3,369,987 | 2/1968 | Davidoff | 137/88 |
| 3,410,292 | 11/1968 | Bennett | 137/93 |
| 3,531,252 | 9/1970 | Rivers | 137/93 |
| 3,592,212 | 7/1971 | Schleimer | 137/88 |

Primary Examiner—Robert G. Nilson
Attorney, Agent, or Firm—Ernest F. Marmorek

[57] ABSTRACT

A system for the measuring and/or controlling of the chemical characteristics of a chemical solution having predetermined chemical characteristics, the system comprising a circulating arrangement through which the chemical solution is flowing, including an analyzer having measuring and reference electrodes placed into the circulating arrangement and which provides information as to the state of the characteristics and, means for delivering additional constituents into the container to maintain the characteristics at a predetermined desired value.

4 Claims, 3 Drawing Figures

3,815,620

MEASURING AND/OR CONTROL DEVICE FOR THE SETTING OF THE CONSTITUENTS OF A CHEMICAL SOLUTION ESPECIALLY OF A GALVANIC BATH

FIELD OF THE INVENTION

The present invention relates to a measuring and/or control device for the setting of the constituent ratio of chemical solutions, especially galvanic baths. Reference is had to our copending patent applications Ser. No. 154,351, filed on June 18, 1971 and Ser. No. 166,425, filed on July 27, 1971.

BACKGROUND OF THE INVENTION

For the setting of the constituent ratio of galvanic baths even today the socalled wet analysis is employed. This wet analysis must be performed manually by the technicians and, therefore it provides only a time-wise delayed and not actual results of an analysis. Attempts have been made to perform the wet analysis automatically and such attempts have led to complicated and large apparatus giving rise to a large number of operational failures.

The measuring instruments described in the "SIEMENS TASCHENBUCH FUR MESSEN UND REGELN IN DER WARME UND CHEMIETECHNIK" can only make the wet analysis easier to perform, however, they cannot be considered a substitute for it.

SUMMARY OF THE INVENTION

It is, therefore, an object of the present invention to provide a measuring and/or control arrangement for the setting of the constituent ratio in a galvanic bath which is capable of continuously mixing, without manual aid, the bath and capable of retaining constant a desired value for the bath so that no changes in the concentration as a result of over-use or depletion can take place.

According to the present invention a system in which a chemical solution is circulated comprises an additional measuring element or analyzer having measuring and reference electrodes placed in it which constitute the elements of a measuring and/or regulating circuit for the setting of the pH magnitude. The measuring and/or control circuit delivers pulses to a dosing arrangement directly opening into the bath. The invention also provides that the dosing arrangement can open into the circulating system.

It has been found as being advantageous that the dosing arrangement is connected ahead of a filter system provided in the circulating system with respect to the flow direction and after the filter system with respect to the flow direction a parallel conduit is provided which opens into the bath and which includes the measuring element or analyzer.

The present invention also provides that in order that the solution could be steadied, the measuring element or analyzer is subdivided into several chambers and one of these chambers, the analyzer chamber itself, contains the electrodes. In order to shield from disturbing voltages, the measuring chamber is provided with a shield. In order that the liquid flowing through the measuring chamber could be further steadied, the invention provides that the analyzer has another chamber which is free from the electrodes and which is a transition chamber having its liquid surface lying over the liquid surface of the bath.

The invention also provides that the control circuit comprises a measuring amplifier, a zero point suppressor and a desired – actual value comparator which are coupled between the electrodes and a control element placed in the excitation circuit of a dosing pump.

As a result of temperature changes, failures in the measurement can occur so that it has been found advantageous to provide in the analyzer a temperature sensor. The control element and a temperature device controlled by the temperature sensor are provided in the excitation circuit of the dosing pump in series in such a manner that the excitation circuit becomes actuated only when the actual and desired values of the temperature are equal.

The arrangement of an additional analyzer in a parallel circuit with respect to the bath as described above has the advantages that a much quicker circulation is attained at lesser turbulence. If a much larger turbulence is present in the bath itself, this could lead to defective measurements. Furthermore, it is more advantageous to protect the analyzer by shields against disturbing voltages which in the bath itself would be practically impossible and, therefore, could lead necessarily to defective measurements.

The accurate dosing is just as much important as the accurate measurement. Accordingly, the invention provides a dosing arrangement in connection with a filter system and the opening of the dosing arrangement in relation to the filter system. In the known methods and arrangements it was impossible to obtain a homogenous mixing of the entire bath.

BRIEF DESCRIPTION OF THE DRAWINGS

The invention will become more readily apparent from the following descriptions of preferred embodiments thereof shown in the accompanying drawings, in which.

DESCRIPTION OF THE PREFERRED EMBODIMENTS

Figure 1:
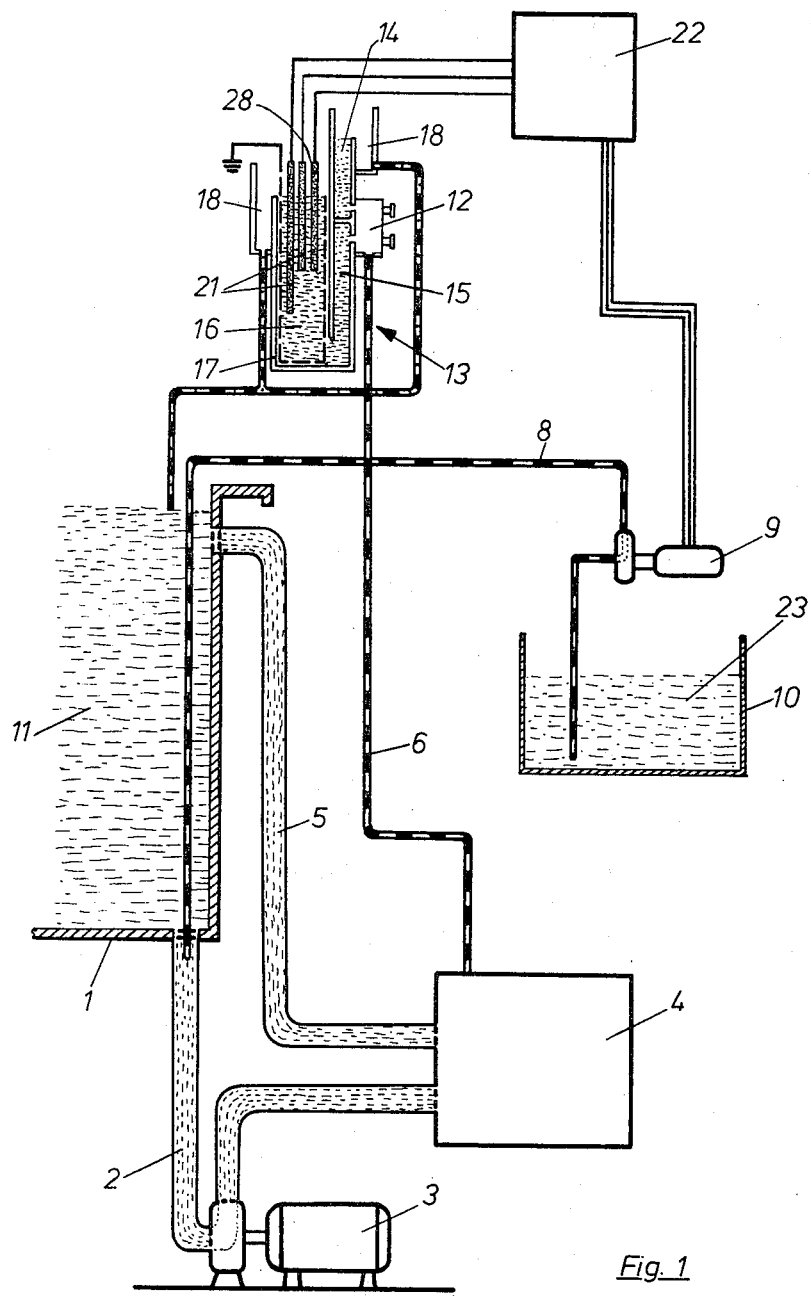
FIG. 1 is a schematic representation of the principles of the controlling system according to the present invention having dosing and mixing arrangements therein.
Figure 2:
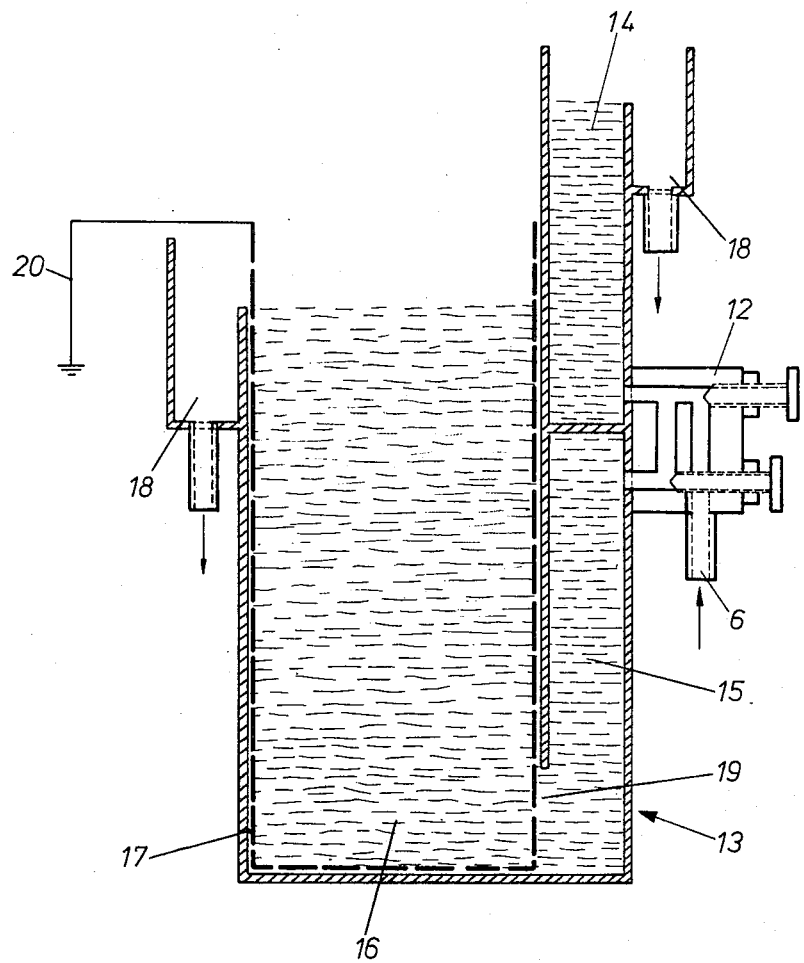
FIG. 2 is the analyzer according to the present invention.

With reference to FIG. 1 it is seen that to the bath 1 a suction conduit 2 is connected to which by means of a pump 3 the chemical solution 11 contained in the bath 1 is pumped through and after passing a filter system 4 it becomes pumped back into the bath 1 through a return conduit 5.

To the filter system 4 a conduit 6 is connected which goes into a dosing control arrangement 12 and which carries a major portion of the chemical solution 11 into an expansion chamber 14 and an amount necessary for the analysis is carried by it into a steadying or smoothing chamber 15. The expansion chamber 14 has an overflow 18 which is returned to the bath 1. The chemical solution 11 flows through a wide opening 19 in the bottom of the smoothing chamber 15 into a measuring chamber 16 of the analyzer 13. The measuring chamber 16 is lined by a metallic mesh 17 in order to shield the contents of the measuring chamber from disturbing potentials. The metallic mesh 17 is returned to ground by means of a conductor 20. The measuring chamber 16 has provided therein the overflow 18 which is returned to the bath 1. In the measuring chamber 16 the measuring and reference electrodes 21 are provided which in turn are connected to a measuring and regulating arrangement 22. A dosing pump 9 receives its control pulses for providing additional doses of the depleted constituents (such as sulphuric acid) from a container 10 by the measuring and regulating arrangement 22. The constituents 23 are delivered over a dosing conduit 8 directly to the suction conduit 2.

Figure 3:
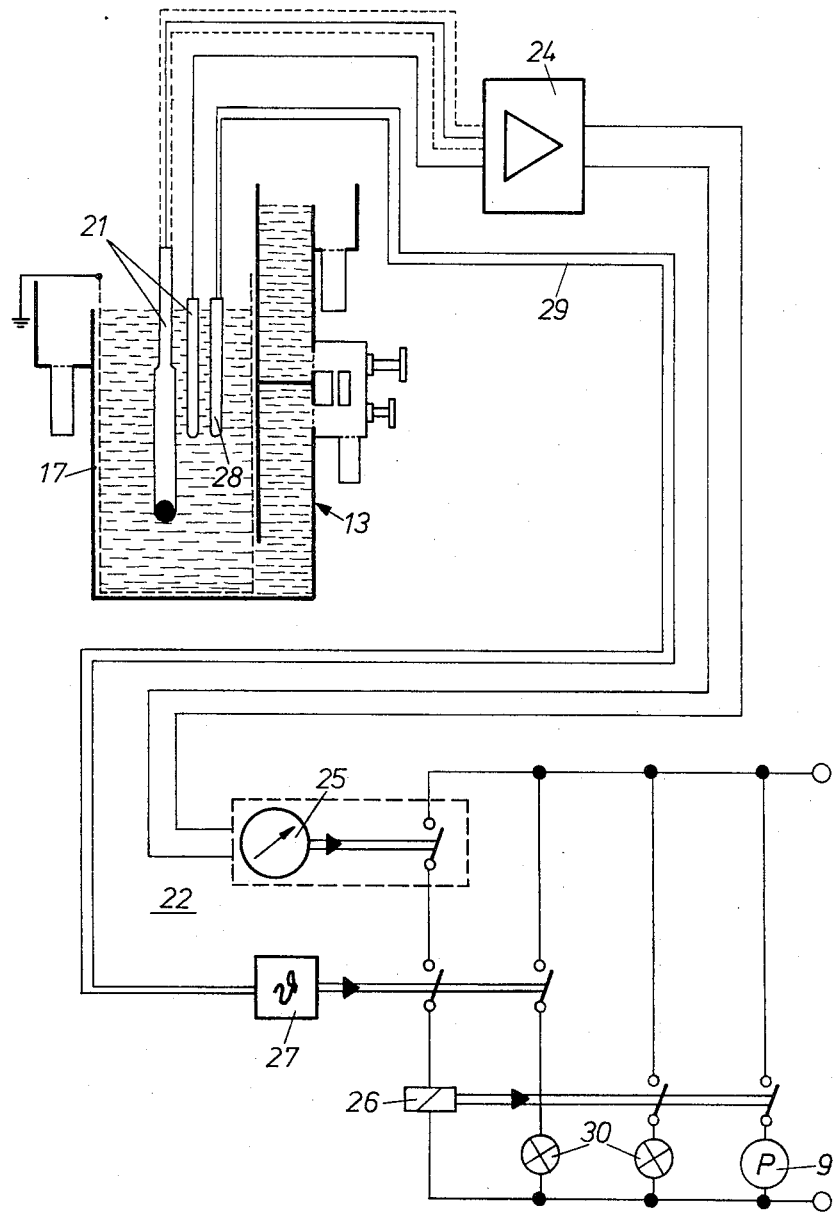
FIG. 3 is the electrical circuit connections of the control arrangement according to the present invention.

The measuring and regulating arrangement 22 is shown in FIG. 3 in the form of a schematic switching or circuit diagram. The measuring and reference electrodes 21 deliver over the pH measuring amplifier 24 pulses into the measuring instrument 25 having a rated and actual value comparator therein.

The pH measuring amplifier 24 can be adjusted to provide for zero point suppression. The measuring instrument 25 controls a relay 26 connecting the current for the dosing pump 9. With the measuring instrument 25 there is connected in series a second contact which is operated by the temperature measuring device 27 in such a manner that the relay 26 receives its exciting current only when the temperature sensor 28 placed in the analyzer 15 senses a temperature which corresponds to the assigned desired value temperature. The temperature sensor 28 is coupled to the temperature measuring device 27 by means of a conductor 29. This arrangement prevents defective measurements and thereby no defective regulating commands are given in case the circulating system fails. In addition, the control can take place only when the bath has reached its operational temperature. A signal lamp 30 is also provided for the visual control of the entire device.

By providing for the direct dosing of the constituents 23 of the bath into the suction conduit 2 a very good mixing of the bath is attained. This fact is further enhanced by the running of the return conduit 5 over the entire bath.

By providing the dosing into the suction conduit 2 the electrolyte passing through conduit 6, the measuring unit or analyzer 13, will have an acidity which is somewhat higher than the content of the bath 11 which have not been completely mixed yet. At the same time such acidity is somewhat higher than the desired value. This value is sensed and given to the desired value limiter which turns off the dosing pump 9. As a result of the continuous mixing through the filter system 3, 4, 5 the acidity will set—in at a value which will be representative for the entire volume of the arrangement. However, in the event this acidity value of the completely mixed bath 11 lies lower than the desired value then the dosing pump 9 is switched in once more and the above-described cycle repeats itself.

The control process is set in motion when the acidity required for the particular operation falls below the said value.

From the above, it is apparent that although the invention has been described hereinbefore with respect to certain specific embodiments thereof, it is evident that many modifications and changes may be made without departing from the spirit of the invention. Accordingly, by the appended claims, we intend to cover all such modifications and changes as fall within the true spirit and scope of this invention.

We claim:

1. A device for measuring and/or controlling chemical characteristics of a chemical solution contained in a container, comprising, in combination, a recirculating system with its inlet and outlet conduits connected to said container, filter means connected between said inlet conduit and said outlet conduit of said recirculating system, a return branch conduit connected to said outlet conduit and opening into said container, an analyzer disposed in said return branch conduit and including means for measuring the characteristics of the chemical solution flowing therethrough, said analyzer comprising several interconnected chambers, at least one of said chambers being a transition chamber that is located higher than the chemical solution in said container, a dosing device including supply means for feeding additional constituents to said chemical solution to bring said solution to a desired value, said supply means opening into said inlet conduit of said recirculating system, and control means operatively connected between said measuring means of said analyzer and said dosing device to control the delivery of said additional constituents in response to the state of the solution measured in said analyzer.

2. The combination as claimed in claim 1, wherein said analyzer further includes a temperature sensor for sensing the temperature of the chemical solution in said analyzer.

3. The device as claimed in claim 1, wherein said analyzer further including a temperature sensor for sensing the temperature of the chemical in said analyzer and said supply means in said dosing device includes a pump, said control means and said temperature sensor are coupled to said pump in series therewith to control its operation so that said pump is operational only when the temperature sensed corresponds to a predetermined desired value of the temperature.

4. A device for measuring and/or controlling chemical characteristics of a chemical solution contained in a container, comprising in combination, a recirculating system with its inlet and outlet conduits connected to said container, filter means connected between said inlet conduit and said outlet conduit of said recirculating system, a return branch conduit connected to said outlet conduit and opening into said container, an analyzer disposed in said return branch conduit and including means for measuring the characteristics of the chemical solution flowing therethrough and a shield associated with said measuring means for shielding said measuring means from disturbing potentials, a dosing device including supply means for feeding additional constituents to said chemical solution to bring said solution to a desired value, said supply means opening into said inlet conduit of said recirculating system, and control means operatively connected between said measuring means of said analyzer and said dosing device to control the delivery of said additional constituents in response to the state of the solution measured in said analyzer, said analyzer comprising a plurality of interconnected chambers, one of said chambers containing said measuring means.

* * * * *